US011537365B2

(12) United States Patent
Batra et al.

(10) Patent No.: US 11,537,365 B2
(45) Date of Patent: *Dec. 27, 2022

(54) DEVELOPER AND RUNTIME ENVIRONMENTS SUPPORTING MULTI-INPUT MODALITIES

(71) Applicant: Microsoft Technology Licensing, LLC, Redmond, WA (US)

(72) Inventors: Soumya Batra, Seattle, WA (US); Hany Mohamed Salaheldeen Mohamed Khalil, Mountlake Terrace, WA (US); Imed Zitouni, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/903,098

(22) Filed: Jun. 16, 2020

(65) Prior Publication Data

US 2020/0310765 A1    Oct. 1, 2020

Related U.S. Application Data

(63) Continuation of application No. 15/963,846, filed on Apr. 26, 2018, now Pat. No. 10,713,019.

(51) Int. Cl.
*G06F 17/00* (2019.01)
*G06F 8/38* (2018.01)
(Continued)

(52) U.S. Cl.
CPC ........... *G06F 8/38* (2013.01); *G06F 3/017* (2013.01); *G06F 3/167* (2013.01); *G06F 8/34* (2013.01)

(58) Field of Classification Search
CPC . G06F 8/38; G06F 3/017; G06F 3/167; G06F 8/34; G06F 1/1686; G06F 3/023;
(Continued)

(56) References Cited

U.S. PATENT DOCUMENTS

2011/0173574 A1*  7/2011  Clavin ................ G06F 3/017
                                                  715/863
2013/0106686 A1*  5/2013  Bennett ............... G06F 3/017
                                                  345/156

(Continued)

OTHER PUBLICATIONS

Peters et al., An IDE for Multimodal Controls in Smart Buidings, ICMI, 2016, pp. 61-65 (Year: 2016).*

(Continued)

*Primary Examiner* — Andrew T McIntosh
(74) *Attorney, Agent, or Firm* — Shook, Hardy & Bacon L.L.P.

(57) ABSTRACT

Developer and runtime environments supporting multimodal input for computing systems are disclosed. The developer environment includes a gesture library of human body gestures (e.g., hand gestures) that a previously-trained, system-level gesture recognition machine is configured to recognize. The developer environment further includes a user interface for linking a gesture of the gesture library with a semantic descriptor that is assigned to a function of the application program. The application program is executable to implement the function responsive to receiving an indication of the gesture recognized by the gesture recognition machine within image data captured by a camera. The semantic descriptor may be additionally linked to a different input modality than the gesture, such as a natural language input.

20 Claims, 6 Drawing Sheets

(51) Int. Cl.
*G06F 3/01* (2006.01)
*G06F 3/16* (2006.01)
*G06F 8/34* (2018.01)

(58) Field of Classification Search
CPC ...... G06F 3/0231; G06F 3/0304; G06F 3/165; G06F 2203/0381; G06F 8/30; G06F 8/36
See application file for complete search history.

(56) References Cited

U.S. PATENT DOCUMENTS

| | | | | |
|---|---|---|---|---|
| 2014/0109023 | A1* | 4/2014 | Murillo | A63F 13/213 |
| | | | | 715/863 |
| 2016/0026434 | A1* | 1/2016 | Johnston | G06F 3/017 |
| | | | | 345/156 |
| 2019/0096106 | A1* | 3/2019 | Shapiro | G06F 3/011 |

OTHER PUBLICATIONS

Collumeau, Jean-Franois, et al. "Hand gesture recognition using a dedicated geometric descriptor." 2012 3rd International Conference on Image Processing Theory, Tools and Applications (IPTA). IEEE, 2012 (Year: 2012).*

Evangelidis, Georgios D., Gurkirt Singh, and Radu Horaud. "Continuous gesture recognition from articulated poses." European Conference on Computer Vision. Springer, Cham, 2014 (Year: 2014).*

* cited by examiner

DEVELOPER AND RUNTIME ENVIRONMENTS SUPPORTING MULTI-INPUT MODALITIES

CROSS-REFERENCE TO RELATED APPLICATIONS

This application is a continuation application and claims priority to U.S. patent application Ser. No. 15/963,846, filed Apr. 26, 2018, and entitled "DEVELOPER AND RUNTIME ENVIRONMENTS SUPPORTING MULTI-INPUT MODALITIES," now issued U.S. Pat. No. 10,713,019, which application is incorporated herein by reference in its entirety.

BACKGROUND

Application developers create application programs that implement specified functions that are responsive to user input. For example, an application program may include a graphical user interface that has a selector that enables a user to initiate a corresponding function of the application program. Other forms of user input include text-based input provided through a text field or speech inputs as may be detected through speech recognition algorithms.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Developer and runtime environments supporting multi-modal input for computing systems are disclosed. The developer environment includes a gesture library of human body gestures (e.g., hand gestures) that a previously-trained, system-level gesture recognition machine is configured to recognize. The developer environment further includes a user interface for linking a gesture of the gesture library with a semantic descriptor that is assigned to a function of the application program. The application program is executable to implement the function responsive to receiving an indication of the gesture recognized by the gesture recognition machine within image data captured by a camera. The semantic descriptor may be additionally linked to a different input modality than the gesture, such as a natural language input.

DETAILED DESCRIPTION

Figure 1:
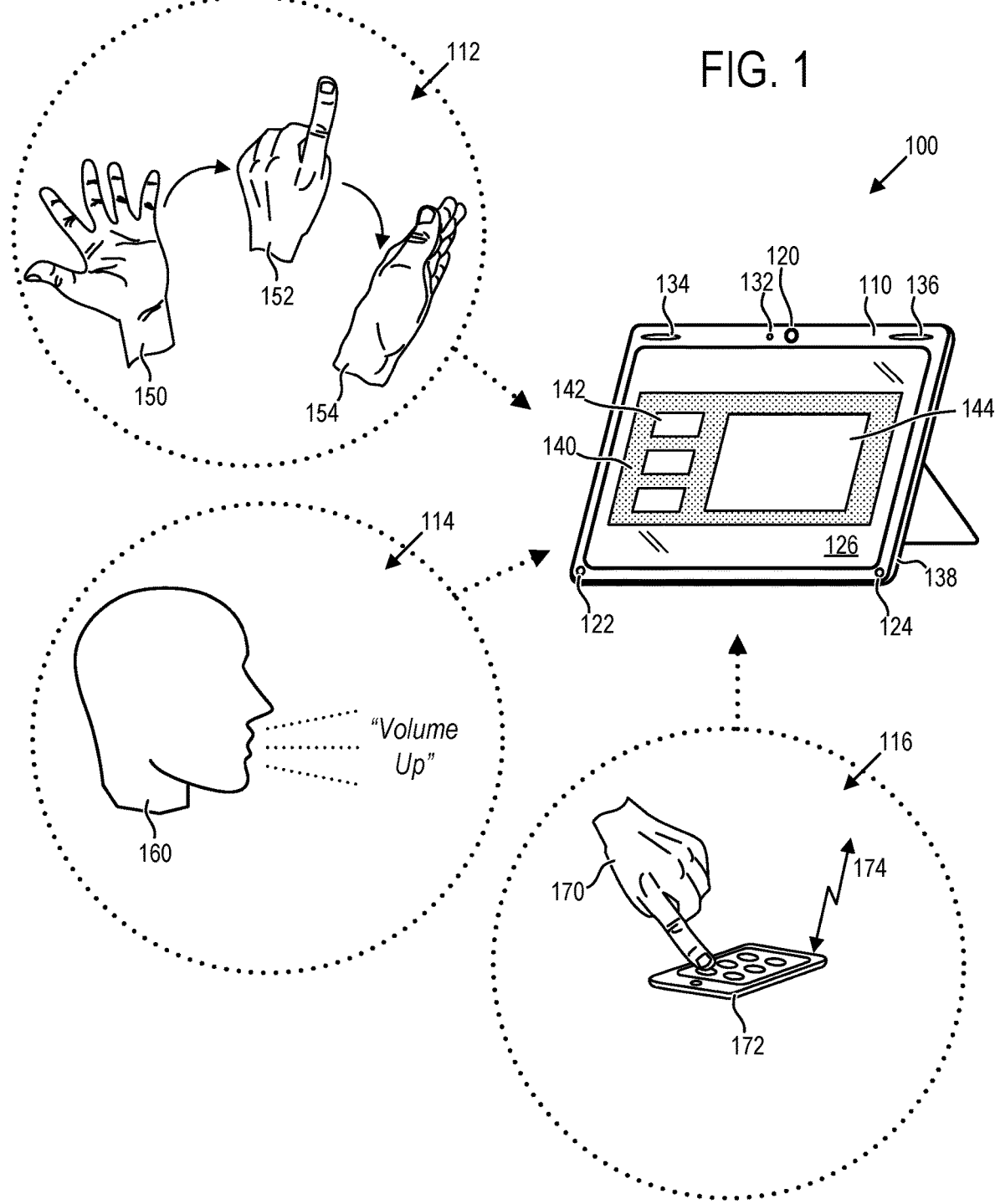
FIG. 1 depicts an example computing system receiving input from a variety of sources.

FIG. 1 depicts an example computing system 100 that includes one or more computing devices. An example computing device 110 of computing system 100 receives input via a variety of different input modalities 112, 114, 116, etc. By supporting multiple input modalities, a user may interact with a computing system in a more intuitive manner or in a manner that best suits the particular needs of the user.

Computing device 110 includes one or more input devices by which user input in the form of input data may be received, such as, for example, a camera 120, microphones 122 and 124, and a touch-sensitive graphical display 126. Computing device 110 further includes one or more output devices such as, for example, previously described graphical display 126, infrared light source 132, and audio speakers 134 and 136.

As a first example, input mode 112 includes a hand gesture input in the form of one or more hand gestures performed by a human subject (i.e., a user) corresponding to one or more hand poses (e.g., as indicated at 150, 152, and 154) and/or transitions between two or more hand poses. Hand gestures of input mode 112 may be captured by a camera (e.g., camera 120) of computing device 110, and may be recognized by the computing device as a corresponding user input. Camera 120 may take the form of a depth camera (e.g., 3D depth camera), color camera, infrared camera, stereoscopic camera, or other suitable camera. Furthermore, camera 120 may be one of a plurality of cameras of computing device 110. Computing device 110 may further include a light projector or light source, such as for projecting visible or infrared light. While hand gesture input is disclosed herein, it will be understood that other human body gestures involving other types of human body parts may be used, as well as gestures performed by an entire human body.

As a second example, input mode 114 includes a natural language speech input in the form of one or more utterances spoken by a user 160. As depicted in FIG. 1, user 160 is speaking the phrase "Volume Up" as a command to computing device 110 to increase volume of audio content presented by the computing device via one or more audio speakers. The spoken utterances of input mode 114 may be captured by microphones 122 and/or 124 of computing device 110, and may be recognized by the computing device as a corresponding user input.

As a third example, input mode 116 includes a natural language text input in the form of one or more text characters input by a user 170 via an input interface (e.g., text field and/or physical or graphical text character selectors). The input interface may further take the form of a physical selector or a graphical selector of an input device 172, for example. Input device 172 may refer to a peripheral device or another computing device that is physically separate from computing device 110, or may refer to an input device (e.g., a keyword, a computer mouse, touch-screen, controller, etc.) of computing device 110 itself. In physically separate implementations, input device 172 may communicate with computing device 110 via a wired or wireless communications link 174.

Computing device 110 is further depicted in FIG. 1 presenting a graphical user interface 140 via graphical display 126. Graphical user interface 140 may include one or more graphical selectors (e.g., graphical selector 142)

and/or one or more graphical content items (e.g., graphical content item 144). A graphical content item may include text, image, and/or video content, as non-limiting examples. In at least some implementations, graphical user interface 140 may take the form of an application-specific graphical user interface that corresponds to an application program executed by computing device 110.

Computing device 110 may take the form of an intelligent assistant computer in at least some implementations. As a non-limiting example, computing device 110 may provide an intelligent assistant service that enables a user to perform tasks such as searching, playing media content, or operating smart devices or appliance, as non-limiting examples. Accordingly, the input devices of the computing devices and systems disclosed herein may be operated to continually monitor a physical environment for user input provided by a user via any of the input modalities disclosed herein.

Figure 2:
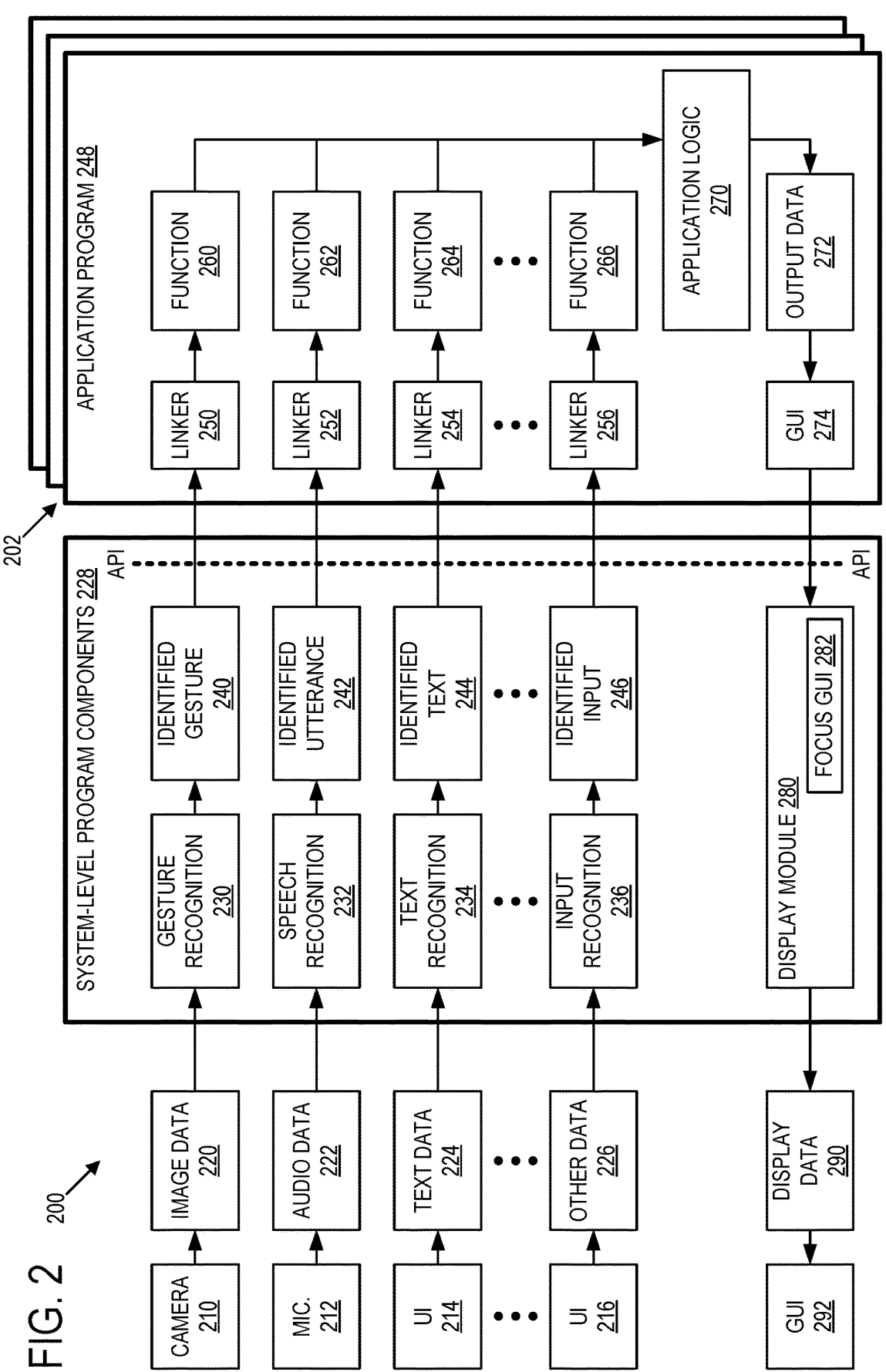
FIG. 2 schematically depicts an example processing pipeline.

FIG. 2 is a schematic diagram depicting an example processing pipeline 200. User input may be received via one or more input devices, such as a camera 210, microphone 212, a user interface 214 including hardware and/or graphical user interfaces, and/or other user interfaces 216 to generate input data including one or more of image data 220, audio data 222, text data 224, and/or other data 226, respectively. Image data may represent an individual image frame or multiple image frames forming a video segment. As previously described with reference to FIG. 1, a camera capturing image data, such as image data 220, may take the form of a depth camera (e.g., 3D depth camera), color camera, infrared camera, stereoscopic camera, or other suitable camera. Image data 220 may include data captured by a plurality of cameras in some implementations. The input data may be received by system-level program components of a computing system. System-level program components may form part of an operating system (i.e., OS program) of the computing system, as a non-limiting example.

For image data 220, hand gesture recognition 230 (or human body gesture recognition in the case of human body gestures performed using other human body parts) may be performed to obtain one or more identified hand gestures 240. In at least some implementations, image data 220 may be pre-processed before being provided to a gesture recognition machine. For example, a video feed of a gesture may be converted to low-level features, which are then fed to the gesture recognition module. For audio data 222, speech recognition 232 may be performed to obtain one or more identified spoken utterances 242. For text data 224, text recognition 234 may be performed to obtain one or more identified text strings 244 formed from one or more text characters. For other forms of input data 226, other suitable forms of input recognition 236 may be performed to obtain one or more other identified user inputs 246. The recognition operations at 230-236 may be performed by respective recognition modules, which when executed by hardware of the computing system may be referred to as recognition machines. These recognition machines may be programmed and/or previously trained to recognize a set of available user inputs, including hand gestures or other human body gestures identified at 240, spoken utterances identified at 242, text strings identified at 244, and/or other input modalities identified at 246.

System-level program components 228 may provide indications of identified user inputs to a target application program 248, which may be one of a plurality of application programs 202 executed by the computing system. In at least some implementations, such indications may be provided to application programs via an application programming interface (API). The term "system-level" as used herein may refer to aspects of a computing system that includes an individual computing device or multiple computing devices communicating over one or more communications networks. For example, system-level program components 228 may reside locally at an individual computing device or may be distributed between a local computing device and one or more remote computing devices (e.g., servers). For example, gestures may be locally resolved at a computing device to features suitable for input to a gesture recognition machine that is remotely located in a cloud-based server system where gesture detection may be performed for the local computing device as a service. In this configuration, the recognized gestures may be sent back to the local computing device over a communications network (e.g., a wide area network) as the identified gesture 240, for example.

Target application program 248 may include one or more linkers 250, 252, 254, 256, etc. in the form of application-level program components that receive an indication from system-level program components and identify corresponding functions for that indication, as will be described in further detail with reference to method 300 of FIG. 3. For example, hand gestures or other human body gestures, spoken utterances, text, and/or other input modalities that are indicated to the target application program may cause the target application program to implement respective functions 260, 262, 264, 266, etc. Such functions may optionally provide input to additional application logic 270 or may directly initiate output data 272 depending on preferences of the application developer.

Output data 272 may include or define aspects of a graphical user interface 274 of the target application program, which may be provided to the system-level program components 228. In at least some implementations, application programs may provide their graphical user interfaces to the system-level program components via an application programming interface. Such graphical user interfaces may be received and processed by a display module 280. A focus graphical user interface 282 corresponding to a focus application program may be identified at the subject computing system from among the plurality of application programs 202. Display module 280 provides display data 290 to a graphical display of the computing system to display at least the focus graphical user interface 282 and/or additional graphical user interface components of application programs and/or system-level program components collectively represented as graphical user interface 292.

Figure 3:
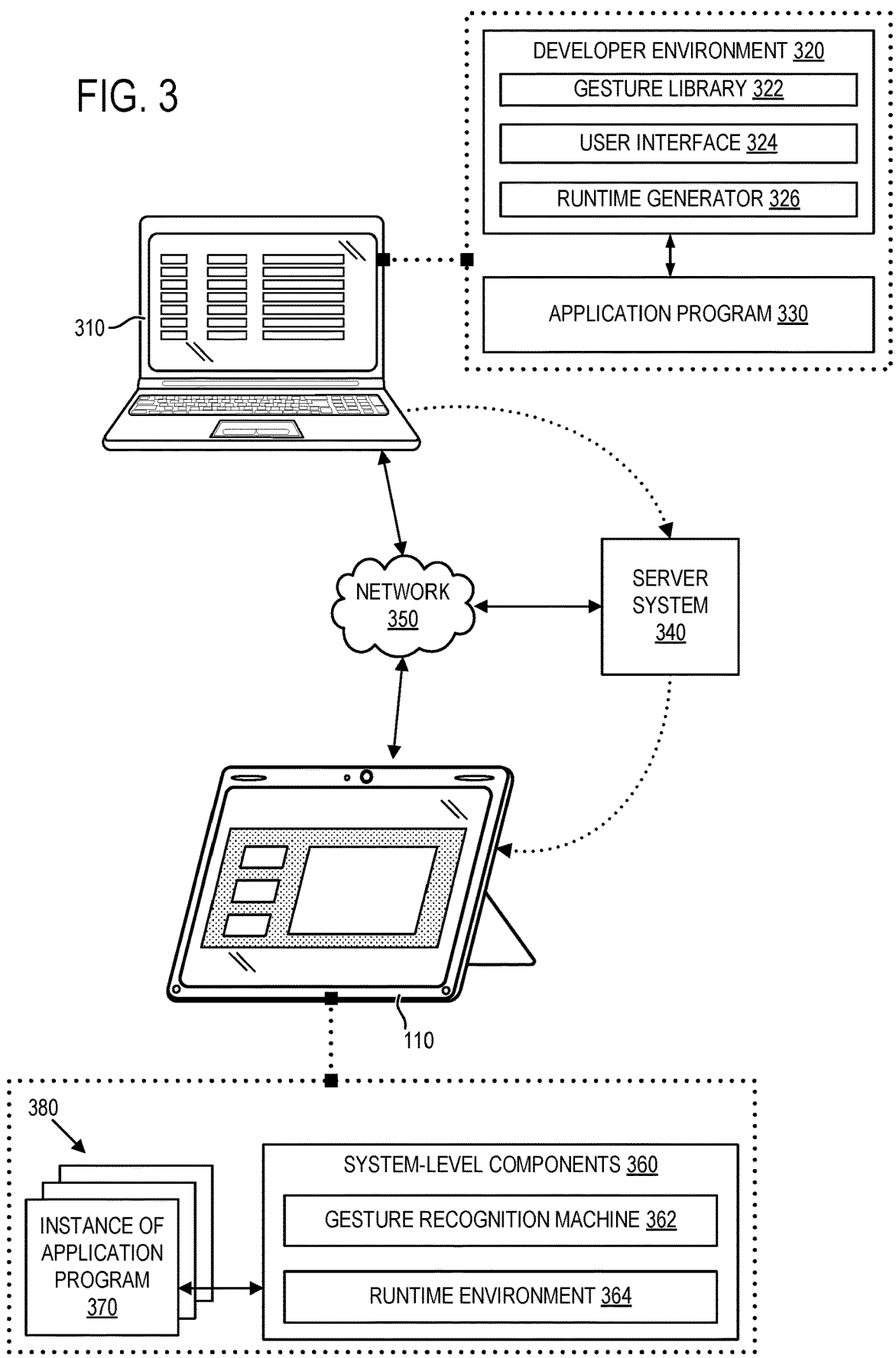
FIG. 3 depicts an example deployment of a developer environment for creating or modifying an application program that is executable by a subject computing system having the runtime environment.

FIG. 3 depicts an example deployment of a developer environment for creating or modifying an application program that is executable by a subject computing system having a runtime environment that corresponds to the runtime environment (e.g., is specifically paired therewith). In FIG. 3, an example developer computing system 310 executes a developer environment 320 that provides to the user a gesture library 322, a user interface 324, and a runtime generator 326 that may be used to create or modify application program 330. The developer environment enables custom application programs that take advantage of previously trained recognition machines configured for different input modalities, without necessarily requiring the developer/user to themselves engage in the training of the recognition machines.

Upon creation or modification of application program 330, an instance of that application program may be communicated to a subject computing system 110 (previously described with reference to FIG. 1) via a communications network 350 (e.g., the Internet), which may optionally traverse an intermediate server system 340. In at least some implementations, server system 340 may host an application store from which client computing systems such as subject computing system 110 may download an instance of application program 330.

Subject computing system 110 may include system-level components 360, which may include a gesture recognition machine 362 and a runtime environment 364, among other suitable components. System-level components 360 may interact with application programs executed by subject computing system 110, such as an instance of application program 330 represented schematically in FIG. 3 at 370. A plurality of application programs 380 may be executed at subject computing system 110, for example.

Figure 4:
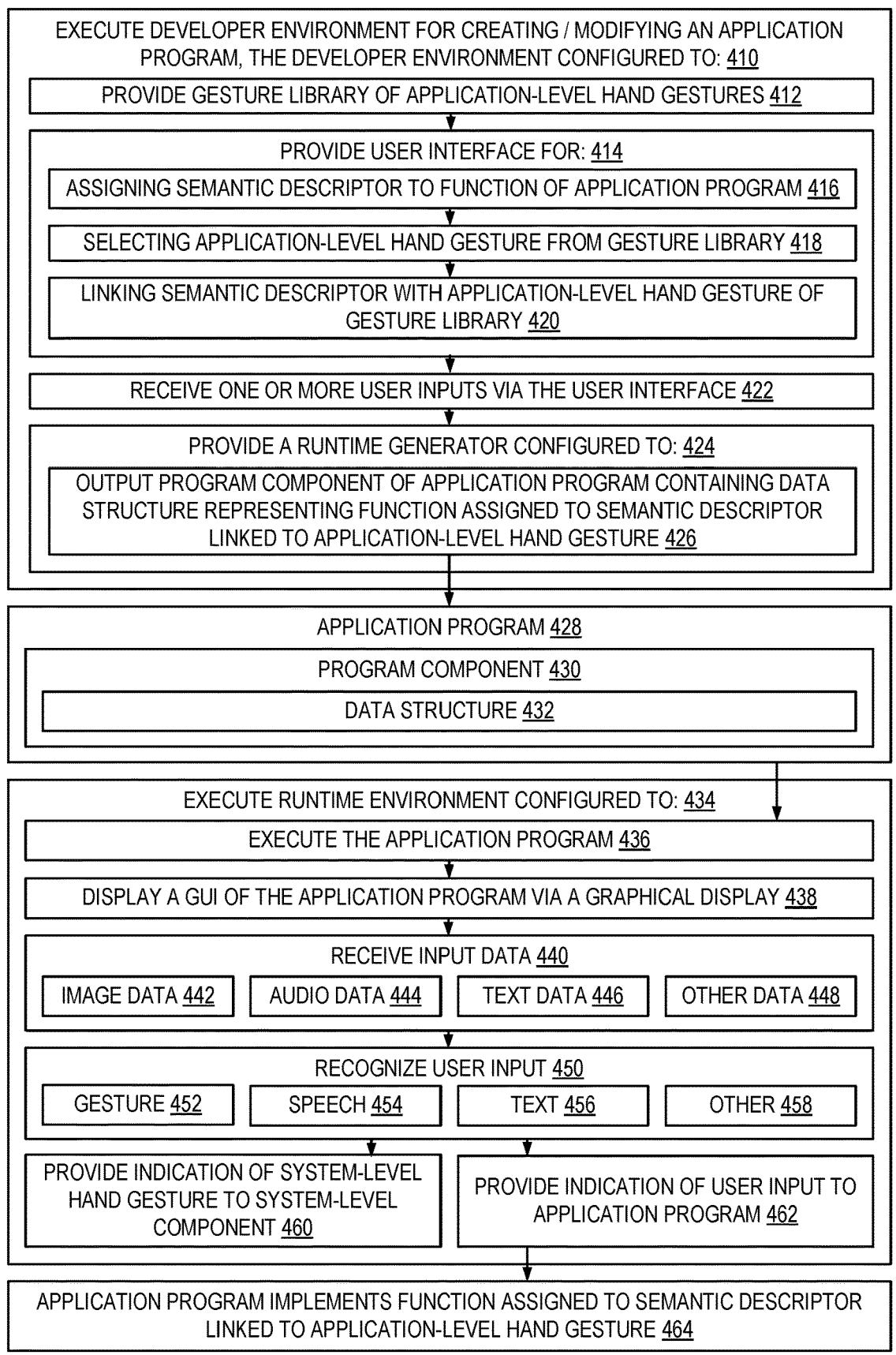
FIG. 4 is flow diagram depicting an example method.

FIG. 4 is flow diagram depicting an example method 400. Method 400 may be performed by one or more computing systems, depending on implementation. For example, as previously described with reference to FIG. 3, a computing system upon which an application program is created or modified may differ from a subject computing system that executes an instance of that application program. In this scenario, a developer environment executed at a computing system may be used to create or modify an application program executed by a runtime environment on the subject computing system. Alternatively, the subject computing system may be the same computing system upon which the application program is created or modified. In this scenario, the developer environment disclosed herein may instead take the form of a user-configuration tool or module of the runtime environment (e.g., a configuration feature of the application program). The user configuration tool or module enables an end user of the runtime environment to modify or otherwise reassign application-level hand gestures or other human body gestures linked to functions through intermediate assigned semantic descriptors, as similarly described with reference to the developer environment. However, it will be understood that a developer environment configured for use by a developer user that is well acquainted with coding programs may differ in several aspects from a user configuration tool or module of a runtime environment configured for use by an end user.

At 410, a developer environment for creating or otherwise modifying an application program is executed by a computing system. The application program created or modified by the developer environment may be executable by a runtime environment of a subject computing system, which may include the computing system that executed the developer environment or another computing system. Within the context of application programs distributed as software products, an instance of the application program created or modified by the developer environment may be distributed for execution by a population of many computing systems. The developer environment may include a variety of program components, such as the previously described gesture library, user interface, and/or runtime generator, among other suitable program components.

At 412, the method includes the computing system executing the developer environment to provide a gesture library of application-level hand gestures or other human body gestures that are available to the application program. A previously-trained, system-level gesture recognition machine of the runtime environment is configured to recognize the application-level hand gestures or other human body gestures of the gesture library. Additionally, the previously-trained, system-level gesture recognition machine may be configured to recognize system-level hand gestures or other human body gestures that are unavailable to application programs.

At 414, the method includes the computing system executing the developer environment to provide a user interface. The user interface may provide one or more user tools for assigning a semantic descriptor to an application-level function of the application program at 416, selecting an application-level hand gesture from a plurality of application-level hand gestures of the gesture library at 418, and linking the application-level hand gesture selected at 416 to the semantic descriptor assigned to the application-level function of the application program at 414. Such user tools may include any suitable combination of command lines, scripting windows, manipulatable graphical elements, etc. As further described with reference to FIG. 5, user tools of the developer environment enable a user to create an application program or modify an application program to provide a desired relationship between input modalities (e.g., gesture input, text input, and speech input, etc.) and their corresponding functions within an application program, thereby enabling the user to customize how the computing system responds to a given user input.

At 422, the method includes receiving one or more user inputs via the user interface of the developer environment to initiate one or more of the previously described operations at 416, 418, and 420. These operations may be performed by a runtime generator in at least some implementations as described below. User input provided via the user tools of the user interface may be received by a runtime generator or other suitable program components of the developer environment, for example.

At 424, the method includes the computing system executing the developer environment to provide a runtime generator. The runtime generator may be configured to output the application program or a program component of the application program containing a data structure representing the application-level function assigned to the semantic descriptor that is linked to the application-level hand gesture. The application program output by the runtime generator is schematically represented at 428 in FIG. 4, including the program component 430 containing the data structure 432 that represents the application-level function assigned to the semantic descriptor that is linked to the application-level hand gesture. The above process may be repeated for other semantic descriptors, functions, hand gestures, etc. to provide a plurality of application-level functions assigned to respective semantic descriptors that are linked to respective application-level hand gestures within data structure 432. Accordingly, data structure 432 represents a particular relationship between particular forms of user input and functions to be implemented by the application or the computing system as a whole responsive to those user inputs, across multiple input modalities.

In at least some implementations, a user selecting the application-level hand gesture at 418 may include selecting two or more hand gesture components of the gesture library that the previously-trained, system-level gesture recognition machine is configured to recognize. As an example, a user selecting the application-level hand gesture at 418 may further include ordering two or more hand gesture components in a time-based sequence of two or more hand poses. Additionally or alternatively, a user selecting the application-level hand gesture at 416 may further include combining the two or more hand gesture components in an individual hand pose. By combining two or more hand gesture components, the developer environment may enable a user to approximate creating entirely new hand gestures, while retaining the functionality of a previously-trained, system-level gesture recognition machine being able to accurately and efficiently recognize such hand gestures.

As a non-limiting example configuration, a hand pose may be represented by a combination of one or more of (1) a palm pose, (2) a finger pose for some or all fingers of the hand, (3) fingertip placement relations for some or all fingers of the hand, and/or (4) fingertip distance relations for some or all fingers of the hand. Palm pose may be represented by one or more of (1.1) a direction (e.g., left, right, up, down, backward, forward) and/or (1.2) an orientation (e.g., left, right, up, down, backward, forward). A finger pose for an individual finger may be represented by (2.1) a direction (e.g., left, right, up, down, backward, forward) and/or (2.2) a flexion (e.g., opened, opened-stretched, folded, folded-tucked). Fingertip placement relations for an individual finger may be represented by (3.1) a relative placement (e.g., left, right, above, below, behind, in front). Fingertip distance relations for an individual finger to another finger or hand portion may be represented by (4.1) a relative distance (e.g., not touching, touching). Each of the above parameters defining a hand pose may be defined by assigning one or more values to the parameters or may be otherwise selected by a user via user tools of the user interface of the developer environment as part of previously described operation 418.

As a non-limiting example configuration, a hand motion may be represented by a combination of one or more of (1) translation, (2) rotation, (3) rate of change, and/or (4) beginning and end states of the hand motion in a two-dimensional or three-dimensional coordinate system. Translation may be represented by one or more of (1.1) a direction (e.g., upward, downward, left, right, forward, back, diagonal-left-upward, diagonal-right-upward, diagonal-left-downward, diagonal-right-downward, etc.) and/or (1.2) a magnitude (e.g., a distance). Rotation may be represented by one or more of (2.1) a direction (e.g., clockwise-arc-right-upward, clockwise-art-right-downward, clockwise-arc-left-upward, clockwise-arc-right-downward, counter-clockwise-arc-right-upward, counter-clockwise-art-right-downward, counter-clockwise-arc-left-upward, counter-clockwise-arc-right-downward, etc.) and (2.2) a magnitude (e.g., angle of rotation). Rate of change may be represented by (3.1) a magnitude (e.g., distance or angle change over time) or (3.2) higher order derivatives thereof (e.g., acceleration). Beginning and end states of the hand motion may be represented by (4.1) an initial hand pose, (4.2) an end hand pose, and optionally (4.3) one or more intermediate hand poses between the initial hand pose and the end hand pose. Each of the above parameters defining a hand motion may be defined by assigning one or more values to the parameters or may be otherwise selected by a user via user tools of the user interface of the developer environment as part of previously described operation 418.

At 434, a subject computing system executes a runtime environment. As previously described, the subject computing system may refer to the computing system that executed the developer environment or to another computing system. The runtime environment is configured to execute one or more application programs, including an instance of the application program 428, as indicated at 436. Where a plurality of application programs are executed by the runtime environment that were created or otherwise modified using an instance of the developer environment, each of the plurality of application programs may have a plurality of application-level functions assigned to respective semantic descriptors that are respectively linked to respective application-level hand gestures recognizable by the previously-trained, system-level gesture recognition machine, as well as other recognition machines for the various other input modalities disclosed herein.

The runtime environment may include or may be executed in combination with one or more previously trained, system-level recognition modules that when implemented by hardware of a computing system may be referred to as a recognition machine. For example, the previously-trained, system-level gesture recognition machine previously described with reference to the gesture library may be configured to recognize a set of one or more application-level and/or system-level hand gestures or other human body gestures. System-level hand gestures, in contrast to application-level hand gestures that are linkable by the developer environment, may by unavailable for linking with semantic descriptors by the developer environment. For example, the set of system-level hand gestures may be reserved for system-level functions of the subject computing system executing the runtime environment or such system-level functions may span multiple application programs or all application programs executed within the runtime environment.

At 438, the runtime environment is further configured to display a graphical user interface of the application program via a graphical display of the subject computing system. In at least some implementations, the runtime environment may be configured to individually and/or concurrently display a respective graphical user interface for each of a plurality of application program executed at the subject computing system. Each of these graphical user interfaces may take the form of an application-specific graphical user interface by which a respective application program executed at the subject computing system provides output or receives input with respect to users. In at least some implementations, the runtime environment may be configured to display a single graphical user interface (e.g., occupying substantially the entire graphical display region) at a given time that corresponds to the focus application, and a user may navigate among individually displayed graphical user interfaces of a plurality of executed applications using system-level hand gestures, as an example.

At 440, the runtime environment is further configured to receive input data representing one or more user inputs received via a variety of different input modalities, including image data 442 captured by one or more cameras of the subject computing system, audio data 444 captured by one or more microphones of the subject computing system, text data 446 received via a text interface (e.g., text field and/or physical or graphical text character selectors) of the subject computing system, and/or other data 448 received via another input interface of the subject computing system. Image data 442 may be captured by a depth camera (e.g., 3D depth camera), color camera, infrared camera, stereoscopic camera, or other suitable camera. Image data 442 may include data captured by a plurality of cameras in some implementations. Image data 442 may represent one or more image frames in the form of a static image or a video segment that captures the physical environment. In at least some implementations, image data 442 may be pre-processed before being provided to a gesture recognition machine. For example, a video feed of a gesture may be converted to low-level features, which are then fed to the gesture recognition module.

At 450, one or more user inputs received at 440 may be recognized from one or more input modalities. As a first example, one or more hand gestures 452 of a set of hand gestures may be recognized by the previously-trained, system-level gesture recognition machine of the subject computing system. The hand gestures recognized at 450 may include one or more application-level hand gestures and/or system-level hand gestures. As another example, a natural language speech input in the form of one or more spoken utterances of human speech may be received via a microphone of the subject computing system and may be recognized at 454 as one or more semantic descriptors by a previously-trained, system-level speech recognition machine of the subject computing system. As yet another example, a natural language text input in the form of one or more text characters that constitute or indicate one or more semantic descriptors may be recognized at 456. At 458, other forms of user input may be recognized, including user input directed to hardware and/or graphical selectors of the subject computing system.

At 460, the runtime environment is further configured to provide an indication of system-level hand gestures recognized by the previously-trained, system-level gesture recognition machine at 450 to system-level components of the subject computing system. In at least some implementations, the system-level components may form part of the runtime environment. For example, responsive to a hand gesture being recognized as a system-level hand gesture, the runtime environment may be configured to implement a system-level function linked to the hand gesture by a system-level component of the runtime environment. As a non-limiting example, the system-level function linked to the system-level hand gesture may include a navigation function to change or identify a focus application program among a plurality of application programs executed on the computing system. For example, a user may navigate among respective graphical user interfaces corresponding to a plurality of application programs executed on the computing system to change or identify a focus application program among the plurality of application programs.

At 462, the runtime environment is further configured to provide an indication of user input recognized at 450 (e.g., excluding system-level hand gestures) to a target application program responsive to receiving the user input at 440. As an example, an indication of an application-level hand gesture recognized at 450 may be provided to a target application program at 462 as an identifier (e.g., by a unique identifier within a domain of identifiers) of the application-level hand gesture. As another example, responsive to one or more spoken utterances of a speech input or text inputs being recognized as one or more semantic descriptors, the runtime environment may provide an indication of each semantic descriptor to the target application program for the target application program to implement the application-level function assigned to that semantic descriptor. For example, the semantic descriptor itself may be provided by the runtime environment to the application program.

In at least some implementations, the target application program may be a focus application program. The focus application program may correspond to a graphical user interface that is currently displayed on the graphical display of the subject computing system and/or last interacted with by a user when the user input is received by an input device of the subject computing system. Furthermore, in at least some implementations, the runtime environment may form part of an operating system of the subject computing system. Indications of application-level hand gestures and/or the indications of the semantic descriptors may be provided to the target application program via an application programming interface of the operating system, for example.

At 464, the application program provided with the indication of the user input implements an application-level function assigned to a semantic descriptor. For example, in the case of an application-level hand gesture being indicated to an application program, the application program implements an application-level function assigned to a semantic descriptor that is linked to the application-level hand gesture. As another example, in the case of a natural language speech input or text input, the user input may be indicated to the target application program as one or more semantic descriptors or portions of a semantic descriptor. As yet another example, in the case of a user input directed at a selector of the computing system, the indication of the user input may include an identifier of the selector.

It will be understood that while method 400 has been described within the context of hand gestures, method 400 may be implemented using other human body gestures involving other types of human body parts, as well as an entire human body.

Figure 5:
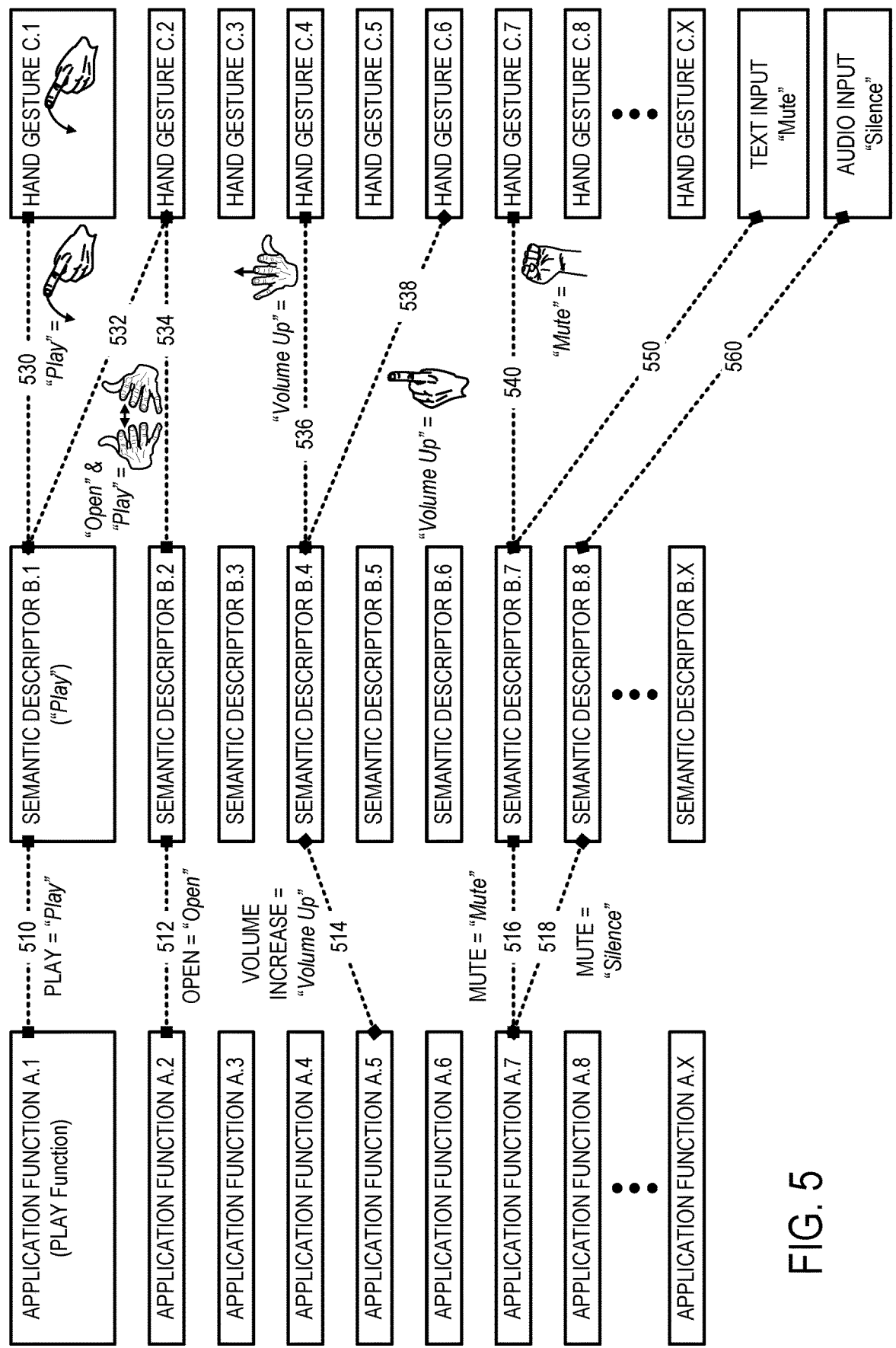
FIG. 5 schematically depicts an example assignment of functions to semantic descriptors, and an example linking of those semantic descriptors to hand gestures.

FIG. 5 schematically depicts an example assignment of functions to semantic descriptors, and an example linking of those semantic descriptors to hand gestures. Accordingly, FIG. 5 depicts an example relationship that may be established by a user through interaction with a developer interface in the case of a developer user creating or modifying an application program, or through interaction with a user-configuration tool or module of a runtime environment in the case of an end user modifying an application program.

In this example, functions of the application program are represented schematically as application functions A.1 through A.X, semantic descriptors are represented schematically as semantic descriptors B.1 through B.X, and hand gestures of a gesture library are represented schematically as hand gestures C.1 through C.X. For each function that is assigned to a semantic descriptor that is linked to a hand gesture, recognition of that hand gesture causes that function to be implemented by the application program.

In this example, application function A.1 (play function) is assigned to semantic descriptor B.1 ("play") as indicated at 510, application function A.2 (open function) is assigned to semantic descriptor B.2 ("open") as indicated at 512, application function A.5 (volume increase function) is assigned to semantic descriptor B.4 ("volume up") as indicated at 514, and application function A.7 (mute function) is assigned to semantic descriptor B.7 ("play") as indicated at 516. In at least some implementations, an application function may be assigned to multiple semantic descriptors. For example, application function A.7 (mute function) is additionally assigned to semantic descriptor B.8 ("silence") indicated at 518. Furthermore, in at least some implementations, multiple functions may be assigned to a semantic descriptor.

Also in this example, hand gesture C.1 is linked to semantic descriptor B.1 ("play") as indicated at 530, hand gesture C.2 is also linked to semantic descriptor B.1 ("play") as indicated at 532 and is further linked to semantic descriptor B.2 ("open") as indicated at 534, hand gesture C.4 is linked to semantic descriptor B.4 ("volume up") as indicated at 536, hand gesture C.6 is also linked to semantic descriptor B.4 ("volume up") as indicated at 538, and hand gesture C.7 is linked to semantic descriptor B.7 ("mute") as indicated at 540.

In view of the above described assigned functions and linked hand gestures by way of intermediate semantic descriptors, recognition of hand gesture C.1 causes function A.1 (play function) to be implemented by the application program, recognition of hand gesture C.4 causes function A.5 (volume increase function) to be implemented by the application program, and recognition of hand gesture C.7 causes application function A.7 (mute function) to be implemented by the application program. Furthermore, hand gesture C.2 provides an example of a hand gesture being linked to multiple semantic descriptors. For example, recognition of hand gesture C.2 causes the application program to implement both function A.1 (play function) and function A.2 (open function) with respect to a content item that is to be opened and played. Semantic descriptor B.4 provides an example of a semantic descriptor being linked to multiple hand gestures. For example, recognition of either of hand gestures C.4 or C.6 causes the application program to implement function A.5 (volume increase function).

FIG. 5 further depicts examples of different input modalities being received. For example, a text input ("mute") is linked to (e.g., includes or is indicated by) semantic descriptor B.7 ("mute") to cause the function A.7 (mute function) to be implemented by the application program. As another example, an audio input in the form of a spoken utterance ("silence") is linked to semantic descriptor B.8 ("silence") to cause function A.7 to be implemented by the application program. Accordingly, function A.7 may be implemented by the application program responsive to a computing system receiving either hand gesture C.7, the text input ("mute"), or the audio input ("silence").

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
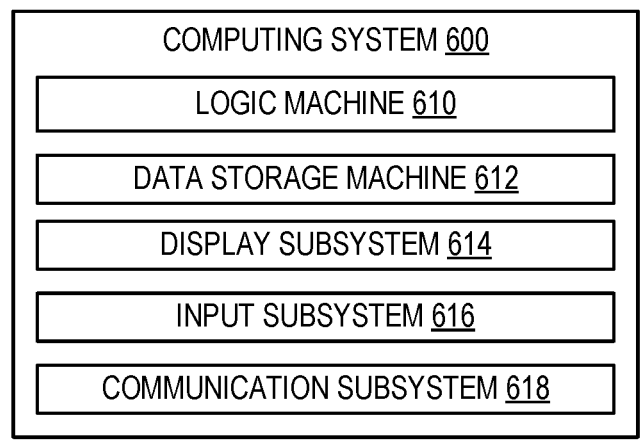
FIG. 6 schematically depicts an example computing system.

FIG. 6 schematically depicts a non-limiting example of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 610 and a computer-readable data storage machine 612. Computing system 600 may optionally include a display subsystem 614, input subsystem 616, communication subsystem 618, and/or other components not shown in FIG. 6.

Logic machine 610 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 612 includes one or more physical devices configured to hold instructions executable by the logic machine to implement the methods and processes described herein. When such methods and processes are implemented, the state of storage machine 612 may be transformed—e.g., to hold different data.

Storage machine 612 may include removable and/or built-in devices. Storage machine 612 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 612 may include volatile, nonvolatile, dynamic, static, read/write, read-only, random-access, sequential-access, location-addressable, file-addressable, and/or content-addressable devices.

It will be appreciated that storage machine 612 includes one or more physical devices. However, aspects of the instructions described herein alternatively may be propagated by a communication medium (e.g., an electromagnetic signal, an optical signal, etc.) that is not held by a physical device for a finite duration.

Storage machine 612 may include compiled or uncompiled instructions that, when executed by a computing system or a logic machine, instantiate the developer environment, runtime environment, and application programs disclosed herein. When instantiated, the development environment, runtime environment, and application programs provide the functionality described herein. It is to be understood that the terms "developer environment", "runtime environment", and "program" are used to refer to both the uninstantiated data stored in a non-volatile data storage machine and the instantiated instance of the executing developer environment, runtime environment, and program, which may include runtime aspects at least temporarily held in volatile data storage machines (e.g., RAM).

Aspects of logic machine 610 and storage machine 612 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 610 executing instructions held by storage machine 612. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 614 may be used to present a visual representation of data held by storage machine 612. This visual representation may take the form of a graphical user interface (GUI). As the herein described methods and processes change the data held by the storage machine, and thus transform the state of the storage machine, the state of display subsystem 614 may likewise be transformed to visually represent changes in the underlying data. Display subsystem 614 may include one or more display devices utilizing virtually any type of technology. Such display devices may be combined with logic machine 610 and/or storage machine 612 in a shared enclosure, or such display devices may be peripheral display devices.

When included, input subsystem 616 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include one or more microphones for speech and/or voice recognition; one or more infrared, color, stereoscopic, and/or depth cameras for machine vision and/or gesture recognition; a head tracker, eye tracker, accelerometer, and/or gyroscope for motion detection and/or intent recognition; as well as electric-field sensing componentry for assessing brain activity.

When included, communication subsystem 618 may be configured to communicatively couple computing system 600 with one or more other computing devices or systems. Communication subsystem 618 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 618 to send and/or receive messages to and/or from other devices via a network such as the Internet.

In accordance with an aspect of the present disclosure, an example computer-readable data storage machine comprises: a developer environment for creating an application program executable by a computing system that includes a previously-trained, system-level gesture recognition machine, the developer environment including: a gesture library of human body gestures available to the application program that the previously-trained, system-level gesture recognition machine is configured to recognize; and a user interface providing one or more user tools for linking a human body gesture to a semantic descriptor assigned to a function of the application program; a runtime generator configured to output a program component of the application program containing a data structure representing the function assigned to the semantic descriptor that is linked to the human body gesture, the application program executable by the computing system to: implement the function assigned to the semantic descriptor linked to the human body gesture responsive to the previously-trained, system-level gesture recognition machine recognizing the human body gesture within image data captured by a camera of the computing system; and implement the function assigned to the semantic descriptor responsive to recognizing input of a different input modality additionally linked to the semantic descriptor. In this example or any other example disclosed herein, the different input modality includes a natural language speech input in the form of one or more spoken utterances received via a microphone of the computing system, the one or more spoken utterances being recognized as the semantic descriptor by a previously-trained, system-level speech recognition machine of the computing system. In this example or any other example disclosed herein, a natural language text input in the form of one or more text characters that constitute or indicate the semantic descriptor, the one or more text characters received via a text input interface of the computing system. In this example or any other example disclosed herein, the previously-trained, system-level gesture recognition machine is further configured to recognize a set of one or more system-level human body gestures that are unavailable for linking with the semantic descriptor by the developer environment, the set of system-level human body gestures being reserved for system-level functions. In this example or any other example disclosed herein, the human body gesture includes a hand gesture; and the user interface further provides one or more user tools for selecting the hand gesture from a plurality of hand gestures of the gesture library. In this example or any other example disclosed herein, selecting the hand gesture includes selecting two or more hand gesture components of the gesture library available to the application program that the previously-trained, system-level gesture recognition machine is configured to recognize. In this example or any other example disclosed herein, selecting the hand gesture further includes ordering the two or more hand gesture components in a time-based sequence of two or more hand poses. In this example or any other example disclosed herein, selecting the hand gesture further includes combining the two or more hand gesture components in an individual hand pose. In this example or any other example disclosed herein, the user interface further provides one or more user tools for assigning the semantic descriptor to the function of the application program.

According to another aspect of the present disclosure, an example computing system comprises: a camera; a microphone; a previously-trained, system-level gesture recognition machine configured to recognize each of a set of hand gestures, a previously-trained, system-level speech recognition machine configured to recognize each of a set of spoken utterances, and a runtime environment configured to: execute an application program on the computing system, the application program having an application-level function assigned to a semantic descriptor that is linked to an application-level hand gesture recognizable by the previously-trained, system-level gesture recognition machine; receive image data captured by the camera; recognize a hand gesture of the set of hand gestures within the image data via the previously-trained, system-level gesture recognition machine; responsive to the hand gesture being recognized as being the application-level hand gesture of the set of hand gestures, providing an indication of the application-level hand gesture to the application program for the application program to implement the application-level function assigned to the semantic gesture linked to the application-level hand gesture; receive audio data captured by the microphone; recognize one or more spoken utterances within the audio data as the semantic descriptor via the previously-trained, system-level speech recognition machine; and responsive to the one or more spoken utterances being recognized as the semantic descriptor, providing an indication of the semantic descriptor to the application program for the application program to implement the application-level function assigned to the semantic descriptor. In this example or any other example disclosed herein, the computing system further comprises a graphical display; and the runtime environment is further configured to: display a graphical user interface of the application program via the graphical display; and identify the application program as a focus application program among a plurality of application programs executed by the runtime environment in which the focus application program corresponds to the graphical user interface displayed by the graphical display;

wherein one or more of the indication of the application-level hand gesture and the indication of the semantic descriptor are provided to the focus application program. In this example or any other example disclosed herein, the application program is one of a plurality of application programs that the runtime environment is configured to execute; and wherein each of the plurality of application programs has a plurality of application-level functions assigned to respective semantic descriptors that are respectively linked to respective application-level hand gestures recognizable by the previously-trained, system-level gesture recognition machine. In this example or any other example disclosed herein, the computing system further comprises a user-configuration tool of the runtime environment including: a user interface providing one or more user tools for linking the application-level hand gesture to the semantic descriptor assigned to the application-level function of the application program; and a runtime generator configured to output a program component of the application program containing a data structure representing the application-level function assigned to the semantic descriptor that is linked to the application-level hand gesture. In this example or any other example disclosed herein, the runtime environment is further configured to, responsive to the hand gesture being recognized as a system-level hand gesture, implement a system-level function linked to the hand gesture by a system-level component of the runtime environment. In this example or any other example disclosed herein, the system-level function linked to the system-level hand gesture includes a navigation function to change or identify a focus application program among a plurality of application programs executed on the computing system. In this example or any other example disclosed herein, the runtime environment is further configured to: receive a natural language text input in the form of one or more text characters that constitute or indicate the semantic descriptor, the one or more text characters received via a text input interface of the computing system; and provide an indication of the semantic descriptor to the application program. In this example or any other example disclosed herein, the runtime environment forms part of an operating system; and wherein the indication of the application-level hand gesture and the indication of the semantic descriptor are provided to the application program via an application programming interface of the operating system.

According to another aspect of the present disclosure, an example method performed by a computing system executing a developer environment for creating an application program executable by a subject computing system comprises: responsive to one or more inputs received via a user interface of the developer environment: linking a semantic descriptor with a hand gesture of a gesture library of hand gestures available to the application program that a previously-trained, system-level gesture recognition machine is configured to recognize; and outputting, from a runtime generator of the developer environment, a program component of the application program containing a data structure representing the function assigned to the semantic descriptor that is linked to the hand gesture, the application program executable by the subject computing system to: implement the function assigned to the semantic descriptor linked to the hand gesture responsive to the previously-trained, system-level gesture recognition machine recognizing the hand gesture within image data captured by a camera of the subject computing system; and implement the function assigned to the semantic descriptor responsive to recognizing input of a different input modality additionally linked to the semantic descriptor. In this example or any other example disclosed herein, the different input modality includes one or more of: a natural language speech input in the form of one or more spoken utterances received via a microphone of the subject computing system, the one or more spoken utterances being recognized as the semantic descriptor by a previously-trained, system-level speech recognition machine of the subject computing system; a natural language text input in the form of one or more text characters that constitute or indicate the semantic descriptor, the one or more text characters received via a text input interface of the subject computing system. In this example or any other example disclosed herein, the method further comprises, responsive to the one or more inputs received via the user interface of the developer environment: selecting the hand gesture from a plurality of hand gestures of the gesture library by selecting two or more hand gesture components of the gesture library available to the application program that the previously-trained, system-level gesture recognition machine is configured to recognize, the two or more hand gesture components: including a time-based sequence of two or more hand poses; or forming the hand gesture as a combination of the two or more hand gesture components.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:
1. A system, comprising:
a processor; and
a memory coupled to the processor and storing instructions that, when executed by the processor, perform operations, comprising:
  capturing input in the form of a hand gesture;
  comparing the hand gesture to a set of previously identified hand gestures;
  identifying the hand gesture as a system-level hand gesture based, at least in part, on the comparison;
  determining a link between the hand gesture and a semantic descriptor the semantic descriptor being assigned a system-level function, wherein one or more other input modalities are linked to the semantic descriptor such that different input modalities, including the system-level hand gesture, are each assigned to the system-level function; and
  causing a performance of the system-level function.

2. The system of claim 1, further comprising instructions for:
receiving additional input in the form of an utterance; and
determining whether the utterance is associated with the semantic descriptor.

3. The system of claim 1, further comprising instructions for:
receiving additional input in the form of text input; and determining whether the text input is associated with the semantic descriptor.

4. The system of claim 1, wherein the system-level function changes a focus between a first application being executed by the system and a second application being executed by the system.

5. The system of claim 1, wherein the system-level function is associated with a navigation operation.

6. The system of claim 1, wherein the set of previously identified hand gestures is stored in a gesture library.

7. The system of claim 6, further comprising instructions for updating the gesture library based, at least in part, on additional input.

8. A method, comprising:
receiving input in the form of a hand gesture;
identifying the hand gesture as a system-level hand gesture based, at least in part, on a comparison between the hand gesture and a library of hand gestures;
determining a link between the hand gesture and a semantic descriptor assigned a system-level function, wherein one or more other hand gestures are linked to the semantic descriptor such that different hand gestures, including the system-level hand gesture, are each assigned to the system-level function; and
causing a performance of the system-level function.

9. The method of claim 8, further comprising:
receiving additional input in the form of an utterance; and
determining whether the utterance is associated with the semantic descriptor.

10. The method of claim 8, further comprising:
receiving additional input in the form of text input; and
determining whether the text input is associated with the semantic descriptor.

11. The method of claim 8, wherein the system-level function changes a focus between a first application being executed by a computing device and a second application being executed by the computing device.

12. The method of claim 8, wherein the system-level function is associated with a navigation operation.

13. The method of claim 8, wherein the hand gesture is a combination of two or more different hand gestures.

14. The method of claim 8, further comprising updating the gesture library of hand gestures based, at least in part, on additional input.

15. A method, comprising:
receiving input in the form of a hand gesture;
identifying a semantic descriptor assigned to a system-level function based, at least in part, on a recognition of the hand gesture, wherein the hand gesture is recognized based, at least in part, on a comparison between the hand gesture and a library of hand gestures, wherein one or more other semantic descriptors are assigned to the system-level function such that different inputs, including the hand gesture, are each assigned to the system-level function;
providing the system level function assigned to the semantic descriptor to a computing device; and
causing the computing device to perform the system-level function.

16. The method of claim 15, further comprising:
receiving additional input in the form of an utterance; and
determining whether the utterance is associated with the semantic descriptor.

17. The method of claim 15, further comprising:
receiving additional input in the form of text input; and
determining whether the text input is associated with the semantic descriptor.

18. The method of claim 15, wherein the system-level function changes a focus between a first application being executed by the computing device and a second application being executed by the computing device.

19. The method of claim 15, wherein the system-level function is associated with a navigation operation.

20. The method of claim 15, wherein the hand gesture is a combination of two or more different hand gestures.

* * * * *